United States Patent
Vishwakarma et al.

(10) Patent No.: US 11,593,014 B2
(45) Date of Patent: Feb. 28, 2023

(54) SYSTEM AND METHOD FOR APPROXIMATING REPLICATION COMPLETION TIME

(71) Applicant: EMC IP Holding Company LLC, Hopkinton, MA (US)

(72) Inventors: Rahul Vishwakarma, Bangalore (IN); Lu Chen, Hopkinton, MA (US); Jitendra Singh, Bangalore (IN); Bing Liu, Tianjin (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/993,437

(22) Filed: Aug. 14, 2020

(65) Prior Publication Data
US 2022/0050614 A1 Feb. 17, 2022

(51) Int. Cl.
*G06F 12/00* (2006.01)
*G06F 3/06* (2006.01)
*G06F 11/07* (2006.01)
*G06F 9/451* (2018.01)

(52) U.S. Cl.
CPC .......... *G06F 3/0647* (2013.01); *G06F 3/0605* (2013.01); *G06F 3/0613* (2013.01); *G06F 3/0619* (2013.01); *G06F 3/0653* (2013.01); *G06F 3/0683* (2013.01); *G06F 9/451* (2018.02); *G06F 11/0757* (2013.01)

(58) Field of Classification Search
CPC .... G06F 3/0605; G06F 3/0613; G06F 3/0619; G06F 3/0647; G06F 3/0653
USPC ....................................... 711/154
See application file for complete search history.

(56) References Cited

U.S. PATENT DOCUMENTS

| | | | | |
|---|---|---|---|---|
| 7,376,898 | B1* | 5/2008 | Yehuda | G06F 21/6218 715/741 |
| 11,030,557 | B2* | 6/2021 | Kohli | G06N 20/20 |
| 2006/0111857 | A1* | 5/2006 | Shah | G01D 1/00 702/85 |
| 2010/0185766 | A1* | 7/2010 | Sano | G06F 1/3203 713/320 |
| 2011/0264717 | A1* | 10/2011 | Grube | H04L 9/085 707/827 |
| 2011/0264989 | A1* | 10/2011 | Resch | G06F 11/076 714/E11.034 |
| 2013/0262959 | A1* | 10/2013 | Resch | G06F 11/10 714/766 |

(Continued)

OTHER PUBLICATIONS

Yaniv Romano, Evan Patterson, Emmanuel Candes, 2019, 33rd Conference on Neural Information Processing Systems (NeurIPS 2019), Vancouver, Canada (Year: 2019).*

*Primary Examiner* — Mohamed M Gebril
(74) *Attorney, Agent, or Firm* — Womble Bond Dickinson (US) LLP (57) ABSTRACT

One embodiment provides a computer implemented method of estimating replication completion time. The method includes creating a historical dataset of prior replication data; determining a set of replication parameters to consider; inputting the historical dataset and the set of replication parameters to a replication completion time estimator module; generating a replication completion time prediction based on the historical dataset and the set of replication parameters; and generating a confidence prediction corresponding to the replication completion time prediction.

18 Claims, 9 Drawing Sheets

(56) References Cited

U.S. PATENT DOCUMENTS

| | | | | |
|---|---|---|---|---|
| 2013/0275736 | A1* | 10/2013 | Kelley | G06Q 30/04 |
| | | | | 713/1 |
| 2014/0278754 | A1* | 9/2014 | Cronin | G06F 17/18 |
| | | | | 705/7.29 |
| 2016/0072891 | A1* | 3/2016 | Joshi | G06Q 30/0641 |
| | | | | 370/254 |
| 2019/0065262 | A1* | 2/2019 | Yoshida | G06F 9/4843 |
| 2021/0026707 | A1* | 1/2021 | Rosenberg | G06F 9/485 |

* cited by examiner

SYSTEM AND METHOD FOR APPROXIMATING REPLICATION COMPLETION TIME

FIELD OF THE INVENTION

Embodiments of the present invention relate generally to techniques for estimating a replication completion time. More particularly, embodiments of the invention provide a more accurate replication completion time estimate, as well as a confidence level for the estimate.

BACKGROUND

Accurate estimation of completion time for an event is one of the most critical factors for enhanced customer experience and critical decision making. For example, if we can approximate the completion time for events such as replication, garbage collection, or backup/restore; then a customer can use this information for understanding when they can perform the event. If they cannot perform the event immediately, they may schedule it for a future time.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Embodiments described herein disclose a computer implemented method of estimating replication completion time. The method includes creating a historical dataset of prior replication data; determining a set of replication parameters to consider; inputting the historical dataset and the set of replication parameters to a replication completion time estimator module; generating a replication completion time prediction based on the historical dataset and the set of replication parameters; and generating a confidence prediction corresponding to the replication completion time prediction.

Another aspect of the present disclosure includes a system for estimating replication completion time. The system includes a storage system management console; a historical database configured to store a historical dataset of prior replication data; and a replication completion time estimator module. The replication completion time estimator module is configured to receive the historical dataset and a set of replication parameters; generate a replication completion time prediction based on the historical dataset and the set of replication parameters; and generate a confidence prediction corresponding to the replication completion time prediction.

Another aspect of the present disclosure includes a non-transitory computer-readable medium storing instructions which, when executed by one or more processors, cause the one or more processors to perform a method of estimating replication completion time. The method includes creating a historical dataset of prior replication data; determining a set of replication parameters to consider; inputting the historical dataset and the set of replication parameters to a replication completion time estimator module; generating a replication completion time prediction based on the historical dataset and the set of replication parameters; and generating a confidence prediction corresponding to the replication completion time prediction.

According to traditional techniques, a replication completion time can be estimated as simply the remaining amount of data divided by the replication speed. However, in more complicated scenarios with numerous systems, such a technique is not sufficiently accurate. Additional important factors can impact replication completion time, including, for example, different Ethernet speeds for each storage system. Additionally, features like low bandwidth optimization (LBO) might enable or disable throttle on a system. In some embodiments, resource intensive operations, such as garbage collection, may be running on a system and may impact replication completion time. A need, therefore, exists for an improved technique for estimating replication completion time.

Aspects of the present disclosure may provide one or more of the following advantages. The techniques disclosed herein can provide a more accurate replication completion time estimate. In one embodiment, the problem statement is translated as a regression, and a regression algorithm is wrapped over a learning framework called conformal prediction. The uniqueness of conformal prediction is that it complements the prediction made by any regression algorithm with a confidence boundary (lower and upper bounds) based on a non-conformity score and acceptable error percentage set by a user. It is the prediction confidence boundary which helps quantify the prediction (replication time) and addresses situations where a user needs to make a choice for performing geo-replication to a specific cite (choosing the best geo-location).

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

In the description of the embodiments provided herein, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Additionally, the terms "server," "client," and "device" are intended to refer generally to data processing systems rather than specifically to a particular form factor for the server, client, and/or device.

System Overview

Figure 1:
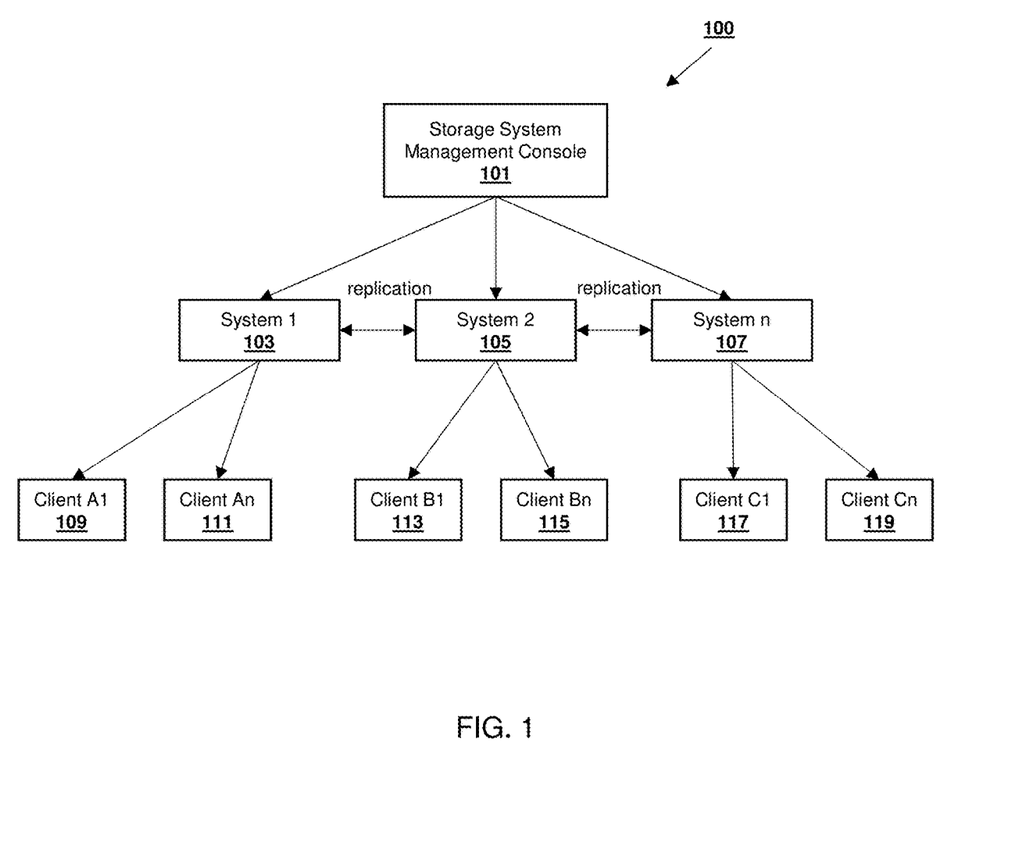
FIG. 1 is a block diagram illustrating an example storage system, according to an embodiment.

FIG. 1 is a block diagram illustrating an example storage system 100, according to an embodiment. In this embodiment, the storage system 100 includes a storage system management console 101, as well as a number of storage systems 1-n, 103, 105, 107. The first storage system 103 is in communication with client A1 109, and client An 111. Likewise, the second storage system 105 is in communication with client B1 113, and client Bn 115; and the third storage system 107 is in communication with client C1 117, and client Cn 119.

The system 100 may include any type of server or cluster of servers. For example, system 100 may be a storage server used for at least one of a variety of different purposes—for example, to provide multiple users with access to shared data and/or to back up mission critical data. The system 100 may be, for example, a file server (e.g., an appliance used to provide NAS capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. The system 100 may have a distributed architecture, or all of its components may be integrated into a single unit. The file system may be implemented as part of an archive and/or backup storage system such as a deduplication storage system available from EMC® Corporation of Hopkinton, Mass. In deduplicated storage systems, multiple stored files or objects may contain and thus reference the same stored chunk of data. A chunk of data within a deduplication storage system may be referred to as a data segment. Fingerprints and other metadata are generated and maintained for stored segments of data and the segment of data is stored only once. The metadata associated with the segments are used to link the stored segments with files or objects.

Note that some or all of the components as shown and described may be implemented in software, hardware, or a combination thereof. For example, such components can be implemented as software installed and stored in a persistent storage device, which can be loaded and executed in a memory by one or more processors that, in response to instructions within the software, are configured to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 2:
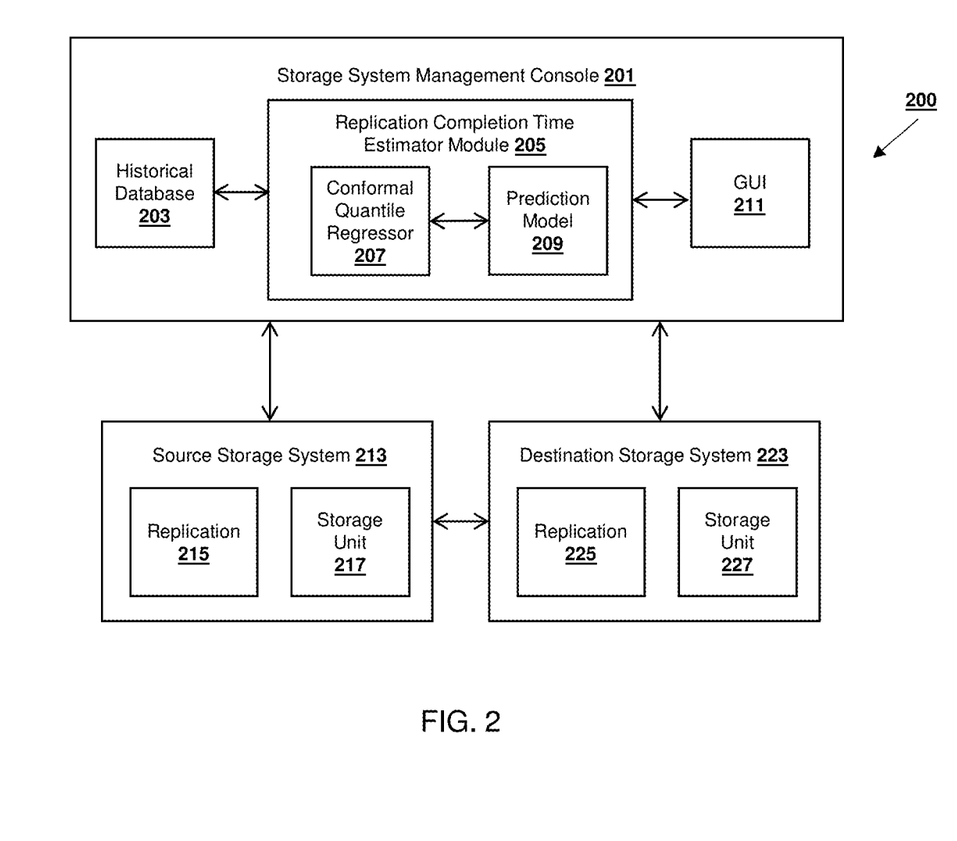
FIG. 2 is a block diagram illustrating an example architecture for estimating a replication completion time, according to an embodiment.

FIG. 2 is a block diagram illustrating an example architecture 200 for estimating a replication completion time, according to an embodiment. In this embodiment, the system architecture 200 includes a storage system management console 201, a source storage system 213, and a destination storage system 223. The source storage system 213 includes a replication 215 and a source storage unit 217, and the destination storage system 223 also includes a replication 225 and a destination storage unit 227. The storage system management console 201 includes a historical database, which can save historical information relating to replications and data transfers. This historical database information can be fed to the replication completion time estimator module 205, which includes the conformal quantile regressor 207 and the prediction model 209 which can generate a replication completion time prediction. In some embodiments, the storage system management console 201 also includes a graphical user interface (GUI) 211 which can display the replication completion time prediction and the confidence prediction. In one embodiment, the GUI can display the expected replication completion times and upper and lower bounds, as well as a current progress indicator.

In one embodiment, an online aggregated mondrian forest can be used, which is a more viable solution for offloading the computation to another system (cloud). In one embodiment, a completion time prediction can consider the behavior of replication on all storage systems which are managed by the storage system management console. This provides the collective behavior of all systems, specifically for replication operations. In such an embodiment, the parameter values can be stored in the historical database 203 for analysis.

In some cases, various parameters for replication do not follow a linear relationship, and using a simple regression model won't be helpful. For this reason, an algorithm which can handle this behavior is desireable. In some embodiments, a quantile regression can be used, as it can be applied to any model, e.g. decision trees. In some embodiments, wrapping a learning framework (conformal prediction) on an underlying model can complement the prediction with a confidence prediction within a variable width.

In embodiments where a customer intends to perform a replication of a large amount of data (e.g., —10 TB) the techniques described herein can provide both an accurate estimated time, as well as a confidence that the given estimate is guaranteed (using conformal prediction for regression). This confidence prediction is achieved using a split-conformal framework which splits the training data into two disjoint subsets: a proper training set and a calibration set. In some embodiments, quantile regression can be chosen for estimating the replication completion time by solving the obtained regression equation. In such embodiments, a goal is to fit a regression model on the training samples, and then use the residuals on a held-out validation set to quantify the uncertainty in future predictions.

In some embodiments, the proposed techniques are accurate for even small data sets, are less computationally intensive, and provide increased accuracy and a confidence prediction. In one example embodiment, a dataset of 18 TB is being replicated from a first storage system to a second storage system. The input dataset for this replication context is fed to the proposed conformal quantile regression, and corresponding output is: estimated replication completion time="x" time units, with a confidence or prediction: [a<x<b]. Here, a and b are prediction width, where "a" is the lower bound and "b" is the upper bound, and "x" is the actual prediction from the underlying algorithm.

In one example embodiment, conformal prediction outputs a prediction interval that has valid coverage within finite samples. Conformal prediction can be leveraged with quantile regression. In one specific example embodiment, given n training samples $\{(X_i, Y_i)\}_{i=1}^n$ a prediction of the value of $Y_{j+1}$ when $X_{j+1}$ is given is desired. The dataset can be split into two parts: a training set and calibration set. Two quantile regressors can be fit on the proper training set to obtain initial estimates of the lower and upper bounds of the prediction interval. Using the calibration set, this prediction interval is conformalized and, if necessary, corrected. A conditional distribution function of Y given X=x is provided in equation (1), and a conditional quantile function is provided in equation (2)

$$F(y|X=x):=P\{Y \leq y|X=x\} \quad (1)$$

$$q_\alpha(x):=\inf\{y \in \mathcal{R} : F(y|X=x) \geq \alpha\} \quad (2)$$

In one embodiment, the lower quantile is provided as $\alpha_{low}=\alpha/2$, while the upper quantile is provided as $\alpha_{hi}=1-\alpha/2$. Thus, a conditional prediction interval for Y given X=x can be obtained according to equation (3), with mis-coverage rate $\alpha$ $$C(x)=[q_{\alpha_{low}}(x), q_{\alpha_{hi}}(x)] \quad (3)$$

Figure 3:
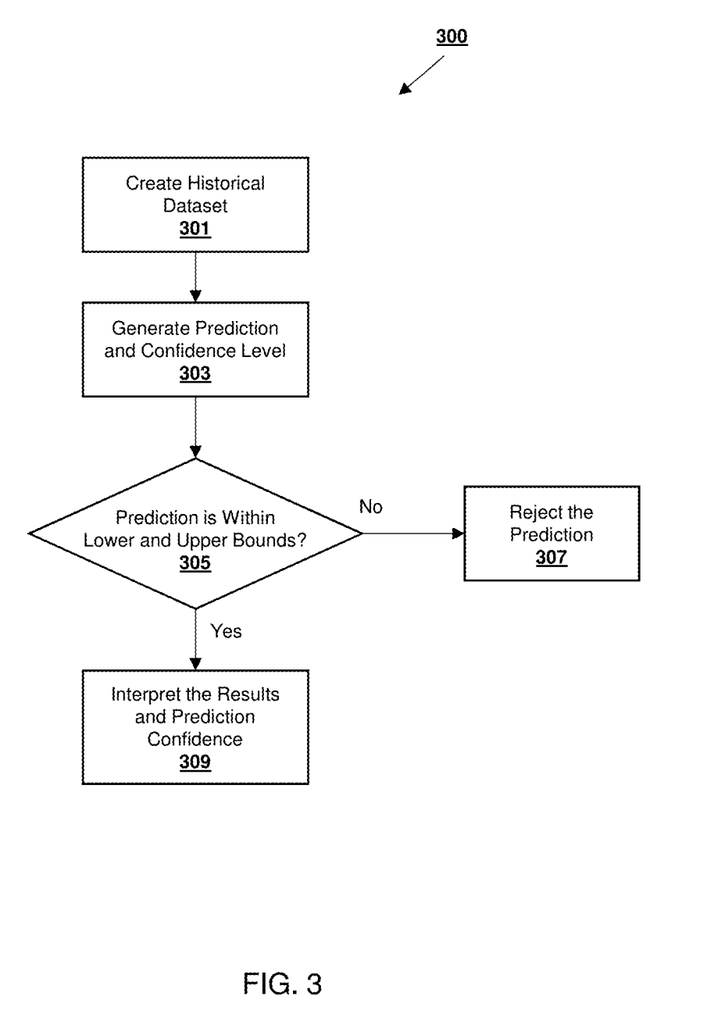
FIG. 3 is a flow diagram of an example replication completion time estimation process, according to an embodiment.

In one embodiment, the pseudocode for the conformal quantile regression is as follows:
Input:
Data $(X_i, Y_i) \in R^p \times R$, $1 \leq i \leq n$
Miscoverage level $\alpha \in \{0,1\}$
Quantile regression algorithm A
  Process:
Randomly split $\{1, \ldots, n\}$ into two disjoint sets $I_1$ and $I_2$
Find two conditional quantile functions $\{\hat{q}_{\alpha_{lo}}, \hat{q}_{\alpha_{hi}}\} \leftarrow (\{(X_i, Y_i): i \in I_1\})$
Compute $E_i$ for each $i \in I_2$
Compute $Q_{1-\alpha}(E, I_2)$
Output:
Prediction interval $C(x)=[\hat{q}_{\alpha_{lo}}(x)-Q_{1-\alpha}(E, I_2), \hat{q}_{\alpha_{hi}}(x)-Q_{1-\alpha}(E, I_2)]$ for unseen input $X_{n+1}=x$ FIG. 3 is a flow diagram of an example replication completion time estimation process 300, according to an embodiment. The replication completion time estimation process 300 can be executed, for example, by the replication completion time estimator module 205 in FIG. 2.

In operation 301, a historical dataset is created. In some embodiments, this historical dataset includes information on different storage systems, storage system parameters, and replication parameters corresponding to different types of replications between different storage systems. This historical dataset can be used, in some embodiments, to generate a more accurate replication completion time estimate for a future replication.

In operation 303, a replication completion time prediction is generated, along with a confidence level or confidence prediction. In some cases, the confidence level can include a lower bound and an upper bound, such that there is, for example, a 95% confidence that the actual completion time will fall between the lower and upper bounds.

In operation 305, it is determined whether the prediction generated in operation 303 is within the lower and upper bounds. If not, the prediction is rejected at operation 307. If the prediction is within the bounds, the results and prediction confidence are interpreted at operation 309. Thus, a prediction that falls outside the bounds of the confidence range can be disregarded as an error or an outlier.

In embodiment, historical data and autosupport data was used to generate the prediction and the confidence level. Only attributes impacting replication were considered, in this embodiment, and other attributes were discarded. In some embodiments, the dataset is scaled in [0, 1] format. In some embodiments, parameters or attributes may include, for example: time, sn, model, eth0mac, repl_mode, repl_type, repl_conn_host, repl__enabled, repl_fsys_status, repl_conn_status, repl_conn_status_since, repl_state, repl_state_pc, t_repl_error, repl_net_bytes_rec, repl_net_bytes_sent, repl_pcomp_to_src, repl_pcomp_to_dest, repl_post_filter, repl_post_lbo, repl_post_lc, repl_pcomp_remaining, repl_files_remaining, repl_comp, repl_syncd_as_of, repl_throttle, repl_encryption, repl_prop_retenlock, delta_enabled, shadow_dir, wire_encryption, presend_max, bw_bytes, delay_ms, use_recipes, listen_port, connection_port, connection_host, delta_status, need_resync, streams, error_num, processed_status, lag_duration, lag_status, lag_trend_kb, dst_system_id, dst_path, dst_processed_status, src_gc_status, compression_ratio, dest_model, dest_eth0mac, dest_gc_status.

In one embodiment, Quantile Conformal prediction was applied (split conformal with random forest) to obtain the results presented in Table 1. The smaller the difference is between the upper and lower bounds, the better the forecast. In some embodiments, the predicted value must be between the lower and upper bounds, or else the prediction is rejected.

TABLE 1

| | Predicted Value | Lower Bound | Upper Bound |
|---|---|---|---|
| 0 | 0.250629 | 0.128616 | 0.4515367 |
| 1 | 1.545545 | 0.087951 | 1.768281 |
| 2 | 0.918973 | 0.282445 | 1.561392 |
| 3 | 0.041771 | 0.031944 | 0.465235 |
| 4 | 0.668344 | 0.286164 | 1.695699 |
| ... | ... | ... | ... |
| 94 | 0.167086 | 0.035533 | 0.269343 |
| 95 | 0.375943 | 0.182750 | 0.581443 |
| 96 | 0.835430 | 0.138800 | 1.213935 |
| 97 | 0.501258 | 0.268118 | 1.539276 |
| 98 | 0.543029 | 0.055078 | 0.872908 |

In one embodiment, experiments were performed on the dataset using four different algorithms, outlined in Table 2. These experiments were performed to understand the prediction performance and the width of the confidence of the prediction. In this embodiment, ensemble trees with symmetric conformal quantile regression (CQR) provided the best prediction, as compared to a conformal neural network.

TABLE 2

| | Percentage in range | Average length |
|---|---|---|
| Symmetric CQR | 91.228070 | 1.354486 |
| Asymmetric CQR | 90.476190 | 1.479800 |
| CQR Neural Net | 90.225564 | 1.554184 |
| CQR Rearrangement Neural Net | 90.726817 | 1.539096 |

Figure 4:
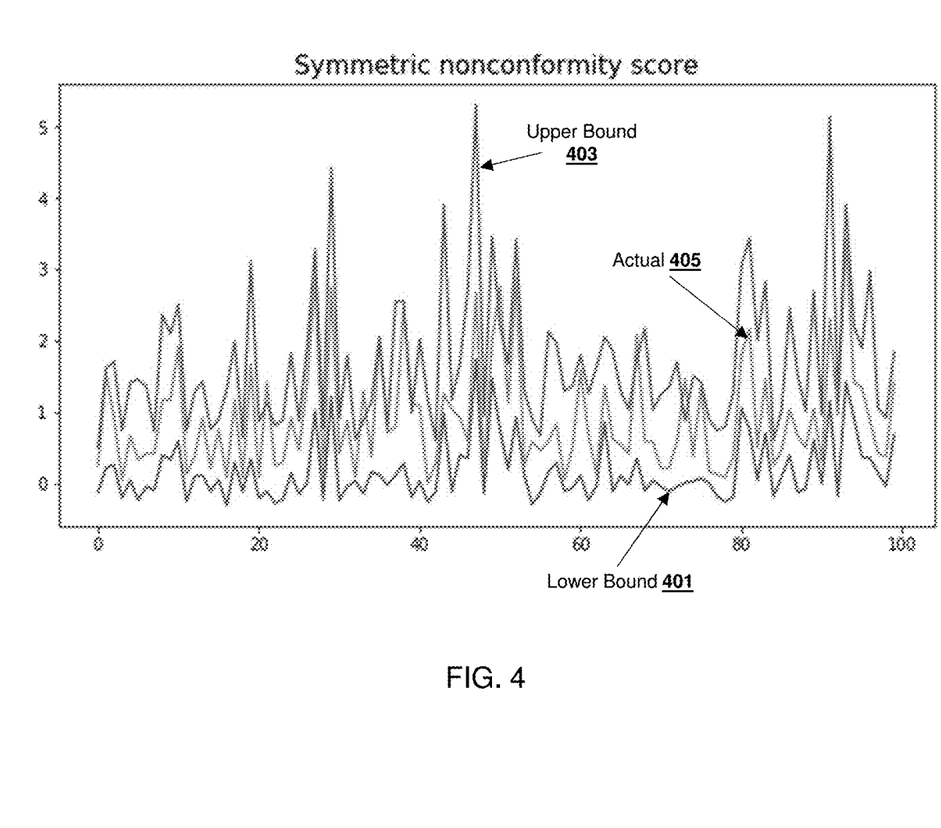
FIG. 4 is a graph of an example replication completion time estimation with upper and lower bounds, according to an embodiment.

FIG. 4 is a graph of an example replication completion time estimation with upper and lower bounds, according to an embodiment. In this embodiment, the actual prediction 405 falls within the lower bound 401 and the upper bound 403 plots in almost every circumstance.

Figure 5:
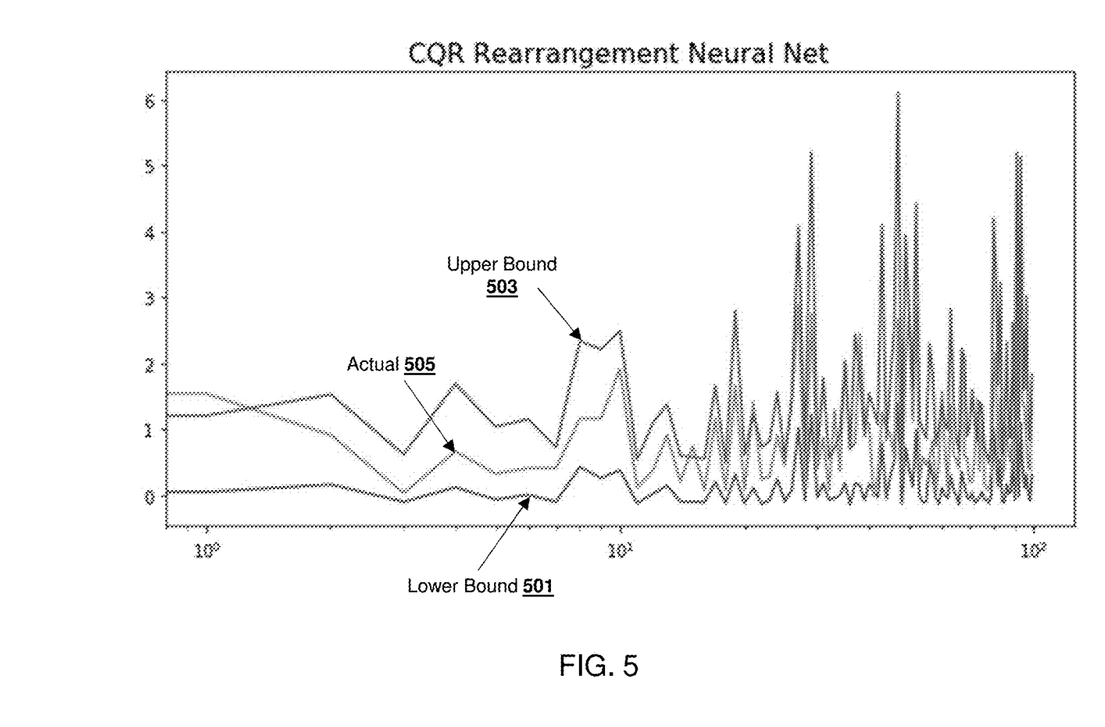
FIG. 5 is a graph of another example replication completion time estimation with upper and lower bounds, according to an embodiment.

FIG. 5 is a graph of another example replication completion time estimation with upper and lower bounds, according to an embodiment. In this embodiment, the actual prediction 505 also falls almost exclusively within the lower bound 501 and the upper bound 503 plots.

In one embodiment, the techniques described herein provide an explainable way (ensemble trees) to perform decision making for choosing a replication type, as well as a replication destination node, based on the confidence prediction that accompanies a completion time prediction. In some embodiments, the replication type or replication destination can be chosen which estimates the minimum amount of time within an acceptable confidence width.

Figure 6:
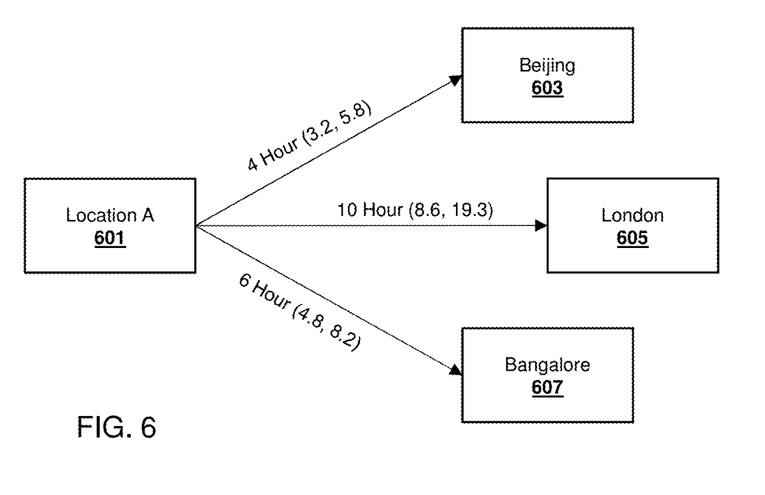
FIG. 6 is a block diagram illustrating an example system for estimating a replication completion time, according to an embodiment.

FIG. 6 is a block diagram illustrating an example system for estimating a replication completion time, according to an embodiment. According to this embodiment, a customer has three remote storage systems in Beijing 603, London 605, and Bangalore 607 as potential replication destinations, with Location A 601 as the replication source. The customer wants to know which of the three targets can provide the minimum replication time. Then, given the prediction confidence, the customer can choose a destination to improve data availability. In this example embodiment, choosing Beijing 603 provides a predicted time of 4 hours, and there is a 95% certainty that the actual replication time will fall between 3.2 hours and 5.8 hours. Choosing London 605 as the destination provides a predicted time of 10 hours, with a 95% confidence that the actual replication time will fall between 8.6 hours and 19.3 hours. Choosing Bangalore as the destination provides a predicted time of 6 hours, with a 95% confidence that the actual replication time will fall between 4.8 hours and 8.2 hours. In some embodiments, a client may choose a replication destination based on a minimum predicted completion time, as well as a narrow confidence range. For example, a low predicted time that has a large possible confidence range may be less desirable than a slightly higher predicted time with a narrow confidence range.

Figure 7:
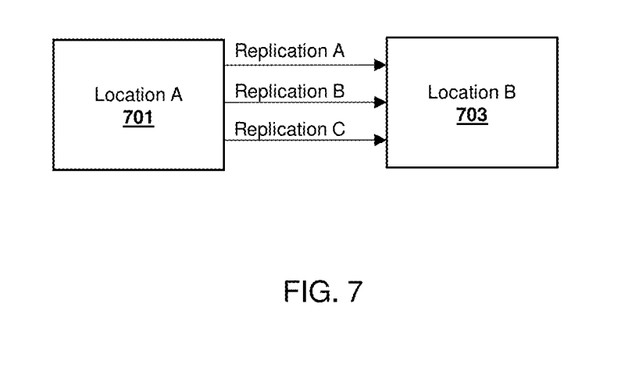
FIG. 7 is a block diagram illustrating another example system for estimating a replication completion time, according to an embodiment.

FIG. 7 is a block diagram illustrating another example system for estimating a replication completion time, according to an embodiment. In this embodiment, a customer consults with a support team to determine which type of replication can provide minimum replication time between location A 701 and location B 703. For example, possible replication types can include mtree replication (Replication A), directory replication (Replication B), or managed file replication (Replication C). Low bandwidth optimization can also be enabled or not, in some embodiments. According to some embodiments, the replication completion time estimate and the confidence prediction can be determined for each replication type, and correspond to the values shown in Table 3. Based on these calculations, a customer can select which type of replication to perform.

TABLE 3

| Replication Type | Completion Estimate | Lower and Upper Bounds |
|---|---|---|
| Replication A | 1.04 Hour | 0.6, 1.2 |
| Replication B | 1.3 Hour | 0.7, 1.9 |
| Replication C | 1.0 Hour | 0.8, 1.7 |

Figure 8:
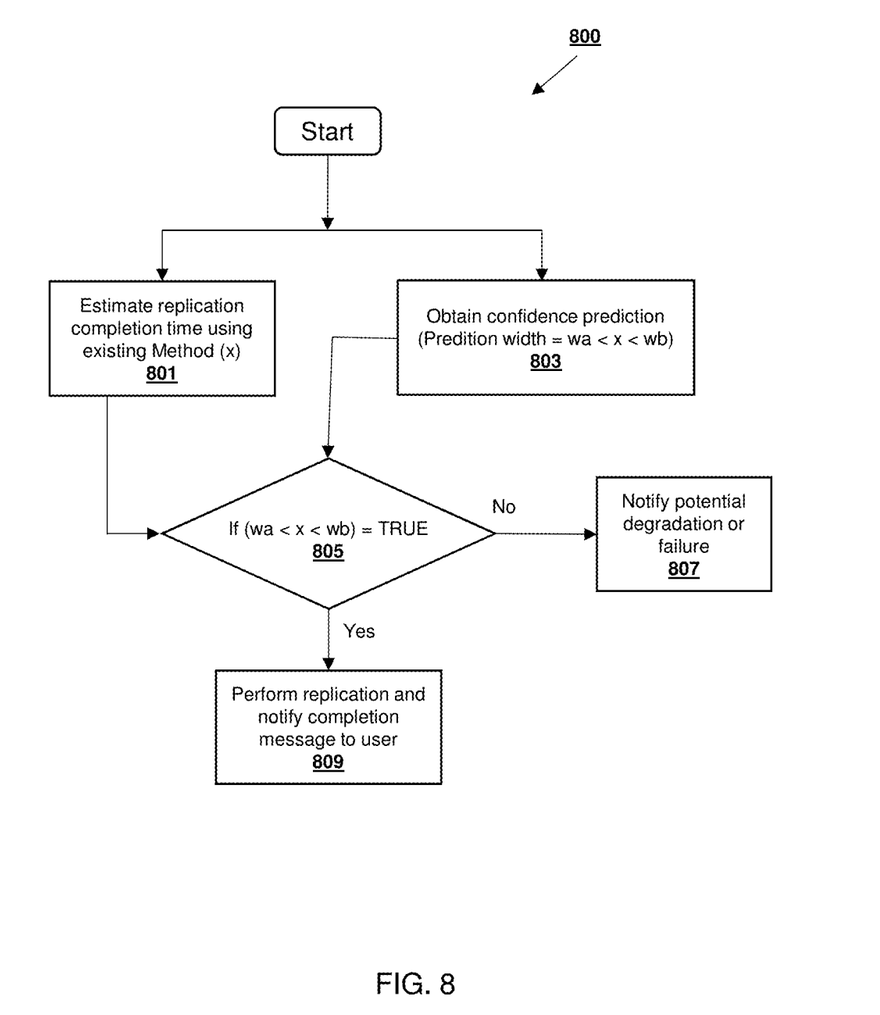
FIG. 8 is a flow diagram of another example replication completion time estimation process, according to an embodiment.

FIG. 8 is a flow diagram of another example replication completion time estimation process 800, according to an embodiment. The replication completion time estimation process 800 can be executed, for example, by the replication completion time estimator module 205 in FIG. 2.

In this example embodiment, the process 800 begins by estimating a replication completion time using an existing method at operation 801, and obtaining a confidence prediction at operation 803.

At operation 805, it is determined whether the estimate "x" falls within the confidence prediction generated at operation 803. If yes, the process proceeds to perform a replication and notify completion at operation 809. If the prediction does not fall within the confidence prediction, the process proceeds to notify potential degradation or failure at operation 807.

In this way, replication performance degradation can be detected. In some embodiments, the threshold for determining performance degradation or failure can be set by a user. For example, a prediction may need to fall outside the confidence predication by a certain amount in order to trigger a notification of potential degradation.

According to one embodiment, an average predicted replication throughput can be determined based on the predicted replication completion time and the amount of data to be replicated. A runtime replication throughput can also be acquired and compared with the predicted value. If the difference between these two exceeds a certain threshold, a customer or support team can be notified to investigate whether anything abnormal has happened. In this manner, problems can be detected in a timely manner, rather than being detected simply from unacceptable running times.

Figure 9:
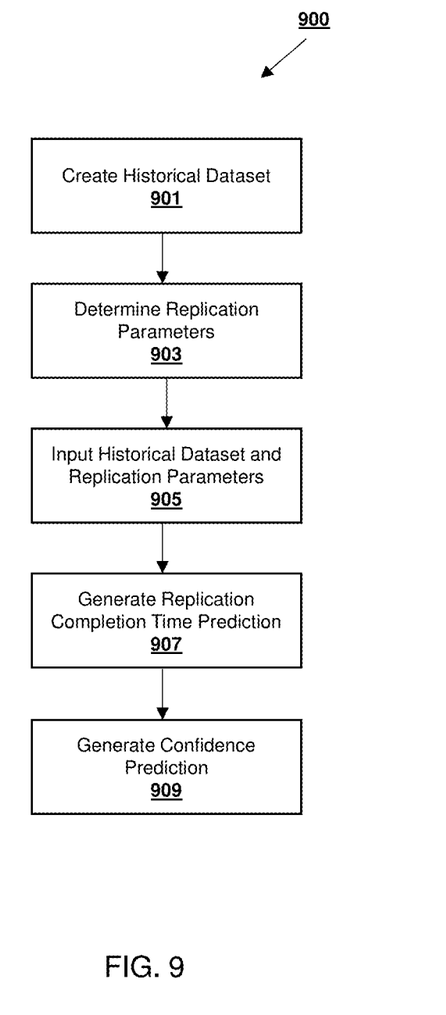
FIG. 9 is a flow diagram of another example replication completion time estimation process, according to an embodiment.

FIG. 9 is a flow diagram of an example replication completion time estimation process 900, according to an embodiment of the present disclosure. The replication completion time estimation process 900 can be executed, for example, by the replication completion time estimator module 205 in FIG. 2.

In operation 901, a historical dataset is created of prior replication data. In some embodiments, the historical dataset can include historical information relating to replications and data transfers, such as information on different storage systems, storage system parameters, and replication parameters corresponding to different types of replications between different storage systems.

In operation 903, a set of replication parameters is determined. As discussed above, the replication parameters can vary from case to case, and can depend on the specifics of the desired replication.

In operation 905, the historical dataset and the set of replication parameters are input to a replication completion time estimator module. In some embodiments, the module can include a conformal quantile regressor and a prediction model, which can generate a replication completion time prediction and a confidence prediction, as discussed above.

In operation 907, a replication completion time prediction is generated based on the historical dataset and the set of replication parameters.

In operation 909, a confidence prediction corresponding to the replication completion time prediction is generated. In some embodiments, the confidence prediction includes a lower boundary and an upper boundary corresponding to the replication completion time prediction. In some embodiments, the confidence prediction includes a percentage calculation (such as 95% confidence) that an actual completion time will fall within the lower boundary and the upper boundary.

In some embodiments, the process can also include generating a number of replication completion time predictions and confidence predictions corresponding to replications between at least one source storage system and a number of destination storage systems. In such an embodiment, the process can also include executing a replication from the source storage system to one of the destination storage systems based on the replication completion time predictions and confidence predictions.

In some embodiments, the process can also include generating a number of replication completion time predictions and confidence predictions corresponding to different replication types between a source storage system and a destination storage system. In such an embodiment, the process can also include executing a particular type of replication between the source storage system and the destination storage system based on the replication completion time predictions and confidence predictions.

Figure 10:
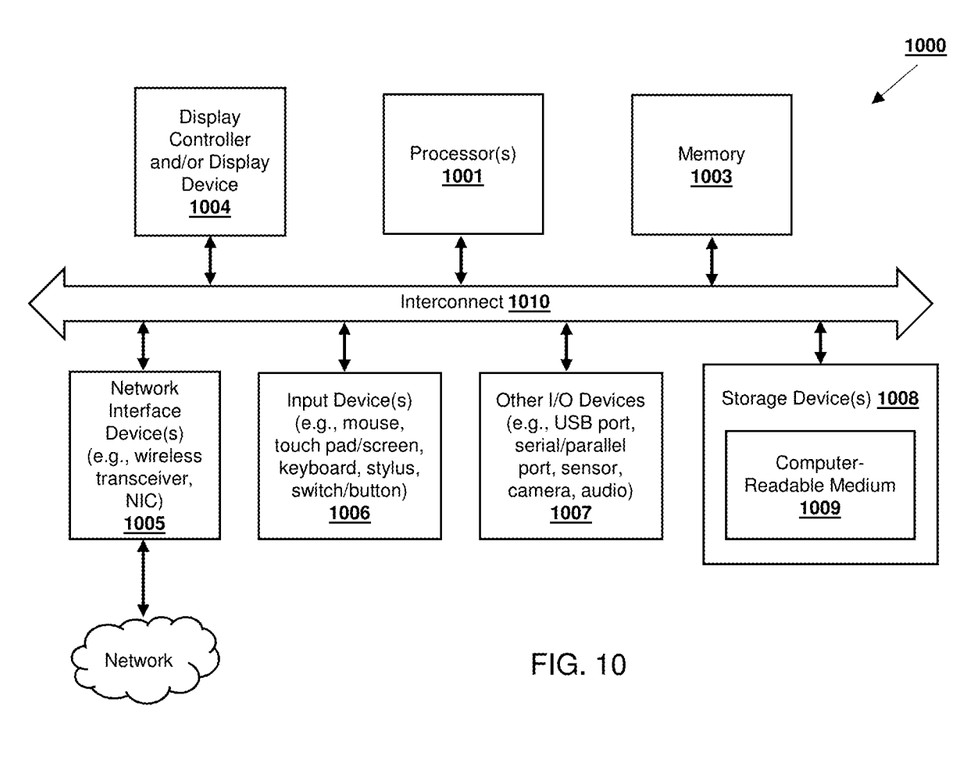
FIG. 10 is a block diagram illustrating an example of a data processing system that may be used with embodiments described herein.

FIG. 10 is a block diagram illustrating an example of a data processing system 1000 that may be used with embodiments described herein. The data processing system 1000 may represent any of the data processing systems described above and may perform any of the processes or methods described above. The data processing system 1000 can include many different components. These components can be implemented as integrated circuits (ICs), discrete electronic devices, or other modules adapted to a circuit board such as a motherboard or add-in card of the computer system, or as components otherwise incorporated within a chassis of the computer system. Note also that the data processing system 1000 is intended to show a high-level view of many components of the computer system. However, it is to be understood that additional components may be present in certain implementations and furthermore, different arrangement of the components shown may occur in other implementations. The data processing system 1000 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment the data processing system 1000 includes one or more processor(s) 1001, memory 1003, network interface devices 1005, I/O devices 1006, 1007 and storage device(s) 1008 connected via a bus or an interconnect 1010. The one or more processor(s) 1001 may be a single processor or multiple processors with a single processor core or multiple processor cores included therein. The processor(s) 1001 may represent one or more general-purpose processors such as a microprocessor, a central processing unit (CPU), or the like. More particularly, the processor(s) 1001 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processor(s) 1001 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

The processor(s) 1001 may be a low power multi-core processor, such as an ultra-low voltage processor, and may act as a main processing unit and central hub for communication with the various components of the system. Such processor can be implemented as a system on chip (SoC). The processor(s) 1001 are configured to execute instructions for performing the operations and steps discussed herein. The data processing system 1000 may further include a graphics/display subsystem 1004, which may include a display controller, a graphics processor, and/or a display device. In one embodiment at least a portion of the graphics/display subsystem 1004 is integrated into the processors(s) 1001. The graphics/display subsystem 1004 is optional and some embodiments may not include one or more components of the graphics/display subsystem 1004.

The processor(s) 1001 communicates with memory 1003, which in one embodiment can be implemented via multiple memory devices to provide for a given amount of system memory. The memory 1003 may include one or more volatile storage (or memory) devices such as random access memory (RAM), dynamic RAM (DRAM), synchronous DRAM (SDRAM), static RAM (SRAM), or other types of storage devices. The memory 1003 may store information including sequences of instructions that are executed by the one or more processor(s) 1001 or any other device. For example, executable code and/or data of a variety of operating systems, device drivers, firmware (e.g., input output basic system or BIOS), and/or applications can be loaded in the memory 1003 and executed by one of the processor(s) 1001. The operating system can be any kind of operating system such as, for example, Windows® operating system from Microsoft®, Mac OS®/iOS® from Apple, Android® from Google®, Linux®, Unix®, or other real-time or embedded operating systems such as VxWorks.

The data processing system 1000 may further include I/O devices such as a network interface device(s) 1005, input device(s) 1006, and other I/O device(s) 1007. Some of the input device(s) 1006 and other I/O device(s) 1007 may be optional and are excluded in some embodiments. The network interface device(s) 1005 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

The input device(s) 1006 may include a mouse, a touch pad, a touch sensitive screen (which may be integrated with a display device of the graphics/display subsystem 1004), a pointer device such as a stylus, and/or a keyboard (e.g., physical keyboard or a virtual keyboard displayed as part of a touch sensitive screen). For example, the input device(s) 1006 may include a touch screen controller coupled to a touch screen. The touch screen and touch screen controller can, for example, detect contact and movement or a break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

The other I/O device(s) 1007 may also include an audio device. An audio device may include a speaker and/or a microphone to facilitate voice-enabled functions, such as voice recognition, voice replication, digital recording, and/or telephony functions. The other I/O device(s) 1007 may also include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. The other I/O device(s) 1007 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1010 via a sensor hub (not shown), while other devices such as a keyboard or thermal sensor may be controlled by an embedded controller (not shown), dependent upon the specific configuration or design of data processing system 1000.

To provide for persistent storage of information such as data, applications, one or more operating systems and so forth, a mass storage (not shown) may also couple to the processor(s) 1001. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of flash based storage to act as an SSD cache to enable non-volatile storage of context state and other such information during power down events so that a fast power up can occur on re-initiation of system activities. In addition, a flash device may be coupled to the processor(s) 1001, e.g., via a serial peripheral interface (SPI). This flash device may provide for non-volatile storage of system software, including a basic input/output software (BIOS) as well as other firmware of the system.

The storage device(s) 1008 may include computer-readable storage medium 1009 (also known as a machine-readable storage medium) on which is stored one or more sets of instructions or software embodying any one or more of the methodologies or functions described herein. The computer-readable storage medium 1009 may also be used to store the same software functionalities described above persistently. While the computer-readable storage medium 1009 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Note that while the data processing system 1000 is illustrated with various components of a data processing system, it is not intended to represent any particular architecture or manner of interconnecting the components; as such, details are not germane to embodiments of the present invention. It will also be appreciated that network computers, handheld computers, mobile phones, servers, and/or other data processing systems, which have fewer components or perhaps more components, may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially. Embodiments described herein are not described with reference to any particular programming language. It will be appreciated that a variety of programming languages may be used to implement the teachings of embodiments of the invention as described herein.

The following clauses and/or examples pertain to specific embodiments or examples thereof. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system according to embodiments and examples described herein. Various components can be a means for performing the operations or functions described.

One embodiment provides for a computer implemented method of estimating replication completion time. The method includes creating a historical dataset of prior replication data; determining a set of replication parameters to consider; inputting the historical dataset and the set of replication parameters to a replication completion time estimator module; generating a replication completion time prediction based on the historical dataset and the set of replication parameters; and generating a confidence prediction corresponding to the replication completion time prediction. In some embodiments, the confidence prediction includes a lower boundary and an upper boundary corresponding to the replication completion time prediction. In some embodiments, the confidence prediction includes a percentage calculation that an actual completion time will fall within the lower boundary and the upper boundary. In some embodiments, the method also includes rejecting a replication completion time prediction if it falls outside the lower boundary or the upper boundary. In some embodiments, the method also includes generating a number of replication completion time predictions and confidence predictions corresponding to replications between at least one source storage system and a number of destination storage systems. In some embodiments, the method also includes executing a replication from the at least one source storage system to one of the destination storage systems based on the replication completion time predictions and confidence predictions. In some embodiments, the method also includes generating a number of replication completion time predictions and confidence predictions corresponding to a number of replication types between a source storage system and a destination storage system. In some embodiments, the method also includes executing a particular type of replication between the source storage system and the destination storage system based on the replication completion time predictions and confidence predictions. In some embodiments, the method also includes generating and displaying a graphical representation of the replication completion time prediction and the confidence prediction using a graphical user interface.

One embodiment provides for a system for estimating replication completion time. The system includes a storage system management console; a historical database configured to store a historical dataset of prior replication data; and a replication completion time estimator module. The replication completion time estimator module is configured to: receive the historical dataset and a set of replication parameters; generate a replication completion time prediction based on the historical dataset and the set of replication parameters; and generate a confidence prediction corresponding to the replication completion time prediction. In some embodiments, the confidence prediction includes a lower boundary and an upper boundary corresponding to the replication completion time prediction. In some embodiments, the confidence prediction includes a percentage calculation that an actual completion time will fall within the lower boundary and the upper boundary. In some embodiments, the replication completion time estimator module is also configured to reject a replication completion time prediction if it falls outside the lower boundary or the upper boundary. In some embodiments, the replication completion time estimator module is also configured to generate a number of replication completion time predictions and confidence predictions corresponding to replications between at least one source storage system and a number of destination storage systems. In some embodiments, the replication completion time estimator module is also configured to execute a replication from the source storage system to one of the destination storage systems based on the replication completion time predictions and confidence predictions. In some embodiments, the replication completion time estimator module is also configured to generate a number of replication completion time predictions and confidence predictions corresponding to a number of replication types between a source storage system and a destination storage system. In some embodiments, the replication completion time estimator module is also configured to execute a particular type of replication between the source storage system and the destination storage system based on the replication completion time predictions and confidence predictions. In some embodiments, the system also includes a graphical user interface configured to generate and display a graphical representation of the replication completion time prediction and the confidence prediction.

One embodiment provides for a non-transitory computer-readable medium storing instructions which, when executed by one or more processors, cause the one or more processors to perform a method of estimating replication completion time. The method includes creating a historical dataset of prior replication data; determining a set of replication parameters to consider; inputting the historical dataset and the set of replication parameters to a replication completion time estimator module; generating a replication completion time prediction based on the historical dataset and the set of replication parameters; and generating a confidence prediction corresponding to the replication completion time prediction. In some embodiments, the confidence prediction includes a lower boundary and an upper boundary corresponding to the replication completion time prediction.

In the foregoing specification, the invention has been described with reference to specific embodiments thereof. However, various modifications and changes can be made thereto without departing from the broader spirit and scope of the invention. The specification and drawings are, accordingly, to be regarded in an illustrative rather than a restrictive sense.

What is claimed is:

1. A computer implemented method of estimating replication completion time, the method comprising:
   creating a historical dataset of prior replication data;
   determining a set of replication parameters to consider based on input by a user;
   inputting the historical dataset and the set of replication parameters to a replication completion time estimator module;
   generating a plurality of replication completion time predictions based on the historical dataset and the set of replication parameters, each replication completion time prediction corresponding to a particular potential replication destination and a particular replication type based on the input by the user;
   generating a confidence prediction corresponding to each replication completion time prediction, the confidence prediction comprising a training set and a calibration set of disjoint training data for a regression model, wherein residuals of the regression model is used to quantify uncertainty in future perditions of the confidence prediction;
   executing a resulting particular replication type at a resulting particular replication destination based on the confidence prediction corresponding to the replication completion time predictions for each potential replication destination and replication type; and
   when executing the resulting particular replication type at the resulting particular replication destination, notifying a completion message of the execution of the resulting particular replication type at the resulting particular replication destination to the user.

2. The computer implemented method as in claim 1, wherein the confidence prediction includes a lower boundary and an upper boundary corresponding to the replication completion time prediction.

3. The computer implemented method as in claim 2, wherein the confidence prediction includes a percentage calculation that an actual completion time will fall within the lower boundary and the upper boundary.

4. The computer implemented method as in claim 2, further comprising:
rejecting a replication completion time prediction if it falls outside the lower boundary or the upper boundary.

5. The computer implemented method as in claim 1, further comprising:
generating and displaying a graphical representation of the replication completion time prediction and the confidence prediction using a graphical user interface.

6. A system for estimating replication completion time comprising:
a storage system management console;
a historical database configured to store a historical dataset of prior replication data; and
a replication completion time estimator module configured to:
receive the historical dataset and a set of replication parameters based on input by a user;
generate a plurality of replication completion time predictions based on the historical dataset and the set of replication parameters, each replication completion time prediction corresponding to a particular potential replication destination and a particular replication type based on the input by the user;
generate a confidence prediction corresponding to each replication completion time prediction, the confidence prediction comprising a training set and a calibration set of disjoint training data for a regression model, wherein residuals of the regression model is used to quantify uncertainty in future perditions of the confidence prediction;
execute a resulting particular replication type at a resulting particular replication destination based on the confidence prediction corresponding to the replication completion time predictions for each potential replication destination and replication type; and
when executing the resulting particular replication type at the resulting particular replication destination, notify a completion message to the user.

7. The system as in claim 6, wherein the confidence prediction includes a lower boundary and an upper boundary corresponding to the replication completion time prediction.

8. The system as in claim 7, wherein the confidence prediction includes a percentage calculation that an actual completion time will fall within the lower boundary and the upper boundary.

9. The system as in claim 7, wherein the replication completion time estimator module is further configured to:
reject a replication completion time prediction if it falls outside the lower boundary or the upper boundary.

10. The system as in claim 6, further comprising:
a graphical user interface configured to generate and display a graphical representation of the replication completion time prediction and the confidence prediction.

11. A non-transitory computer-readable medium storing instructions which, when executed by one or more processors, cause the one or more processors to perform a method of estimating replication completion time, the method comprising:
creating a historical dataset of prior replication data;
determining a set of replication parameters to consider based on input by a user;
inputting the historical dataset and the set of replication parameters to a replication completion time estimator module;
generating a plurality of replication completion time predictions based on the historical dataset and the set of replication parameters, each replication completion time prediction corresponding to a particular potential replication destination and a particular replication type based on the input by the user;
generating a confidence prediction corresponding to each replication completion time prediction, the confidence prediction comprising a training set and a calibration set of disjoint training data for a regression model, wherein residuals of the regression model is used to quantify uncertainty in future perditions of the confidence prediction;
executing a resulting particular replication type at a resulting particular replication destination based on the confidence prediction corresponding to the replication completion time predictions for each potential replication destination and replication type; and
when executing the resulting particular replication type at the resulting particular replication destination, notifying a completion message to the user.

12. The non-transitory computer-readable medium as in claim 11, wherein the confidence prediction includes a lower boundary and an upper boundary corresponding to the replication completion time prediction.

13. The method as in claim 1, wherein generating the plurality of replication completion time predictions includes using a conformal quantile regressor.

14. The method as in claim 5, wherein executing the particular replication type at a particular replication destination includes receiving a selection via the graphical user interface of the particular replication type and replication destination from user.

15. The system as in claim 6, wherein generating the plurality of replication completion time predictions includes using a conformal quantile regressor.

16. The system as in claim 10, wherein executing the particular replication type at a particular replication destination includes receiving a selection via the graphical user interface of the particular replication type and replication destination from the user.

17. The non-transitory computer-readable medium as in claim 11, wherein the method further comprises:
generating and displaying a graphical representation of the replication completion time prediction and the confidence prediction via a graphical user interface; and
receiving a selection via the graphical user interface of the particular replication type and replication destination from the user.

18. The non-transitory computer-readable medium as in claim 11, wherein generating the plurality of replication completion time predictions includes using a conformal quantile regressor.

* * * * *

UNITED STATES PATENT AND TRADEMARK OFFICE
CERTIFICATE OF CORRECTION

PATENT NO. : 11,593,014 B2
APPLICATION NO. : 16/993437
DATED : February 28, 2023
INVENTOR(S) : Rahul Vishwakarma et al.

It is certified that error appears in the above-identified patent and that said Letters Patent is hereby corrected as shown below:

In the Claims

In Claim 1, Column 14, Line 56, delete "future perditions of" and insert --future predictions of--.

In Claim 6, Column 15, Lines 38-39, delete "future perditions of" and insert --future predictions of--.

In Claim 11, Column 16, Line 21, delete "future perditions of" and insert --future predictions of--.

In Claim 14, Column 16, Line 43, delete "from user" and insert --from the user--.

Signed and Sealed this
Twenty-first Day of January, 2025

Coke Morgan Stewart
*Acting Director of the United States Patent and Trademark Office*